(12) United States Patent
Phillips et al.

(10) Patent No.: US 9,339,896 B1
(45) Date of Patent: May 17, 2016

(54) METHOD FOR MAKING AN OIL FIELD MAT (71) Applicant: HB GREEN RESOURCES, LLC, Lafayette, LA (US)

(72) Inventors: Mark Leon Phillips, Lafayette, LA (US); Kenneth Ray Boersma, Wadsworth, OH (US)

(73) Assignee: HB GREEN RESOURCES, LLC, Lafayette, LA (US)

( * ) Notice: Subject to any disclaimer, the term of this patent is extended or adjusted under 35 U.S.C. 154(b) by 224 days.

(21) Appl. No.: 13/909,923

(22) Filed: Jun. 4, 2013

Related U.S. Application Data (60) Provisional application No. 61/655,344, filed on Jun. 4, 2012.

(51) Int. Cl.
*B23P 11/00* (2006.01)
*E01C 5/00* (2006.01)
*C08L 23/06* (2006.01)
*E01C 5/18* (2006.01)
*E01C 5/20* (2006.01)
*E01C 5/22* (2006.01)
*E01C 9/00* (2006.01)

(52) U.S. Cl.
CPC .................. *B23P 11/00* (2013.01); *C08L 23/06* (2013.01); *E01C 5/00* (2013.01); *E01C 5/18* (2013.01); *E01C 5/20* (2013.01); *E01C 5/22* (2013.01); *E01C 9/00* (2013.01); *Y10T 29/49623* (2015.01); *Y10T 29/49629* (2015.01); *Y10T 29/49947* (2015.01); *Y10T 29/49963* (2015.01)

(58) Field of Classification Search
CPC .............. B23P 11/00; Y10T 29/49623; Y10T 29/49629; Y10T 29/499947; Y10T 29/49963; E01C 5/00; E01C 5/18; E01C 5/20; E01C 5/22; E01C 9/00; C08L 23/06
See application file for complete search history.

(56) References Cited

U.S. PATENT DOCUMENTS

| | | | | |
|---|---|---|---|---|
| 4,462,712 | A * | 7/1984 | Penland, Sr. | 404/36 |
| 5,032,037 | A * | 7/1991 | Phillips et al. | 404/73 |
| 5,316,408 | A | 5/1994 | Stanley et al. | |
| 6,380,309 | B1 | 4/2002 | Parker et al. | |
| 7,500,336 | B2 | 3/2009 | McGivern et al. | |
| 7,985,475 | B2 | 7/2011 | Dubrow | |
| 2002/0188074 | A1 * | 12/2002 | Parker et al. | 525/166 |

* cited by examiner

*Primary Examiner* — Sarang Afzali
*Assistant Examiner* — Ruth G Hidalgo-Hernandez
(74) *Attorney, Agent, or Firm* — Buskop Law Group, PC; Wendy Buskop (57) ABSTRACT

A method making an oil field mat from a plurality of synthetic board to create a tri-layer oil field mat usable to support trucks, equipment, and personnel around a derrick, or a Christmas tree having central couplers and end caps.

7 Claims, 12 Drawing Sheets

METHOD FOR MAKING AN OIL FIELD MAT

CROSS REFERENCE TO RELATED APPLICATION

The current application claims priority to and the benefit of Provisional Patent Application Ser. No. 61/655,344 filed on Jun. 4, 2012, entitled "METHOD FOR MAKING AN OIL FIELD MAT". This reference is hereby incorporated in its entirety.

FIELD

The present embodiments generally relate to a method to make a tri-layer oil field support mat usable to support trucks, equipment, and personnel around a drilling rig.

BACKGROUND

A need exists for a method to make a synthetic, easy to install, easy to remove, highly durable mat which can withstand extreme temperatures for use around oil field equipment.

A need exists for a method to make an oil field mat from materials that do not absorb oil field contaminants.

A further need exists for a method to make an oil field mat that is safer for personnel, and which maintains the original mat shape regardless of torque applied to the mat, weight applied to the mat or movement applied to the mat.

A need exists for a method to make an oil field mat with a slip resistant surface.

A need exists for a method to make an oil field mat that is has a pinless, simplistic assembly.

A need exists for a method to make an oil field mat that protects rig containment material from machinery used around a drilling rig.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The present embodiments relate to a method to make a tri-layer oil field support mat usable to support trucks, equipment, and personnel around a derrick, or a Christmas tree.

The present embodiments further relate to a making an oil field mat from a plurality of synthetic boards.

Figure 1:
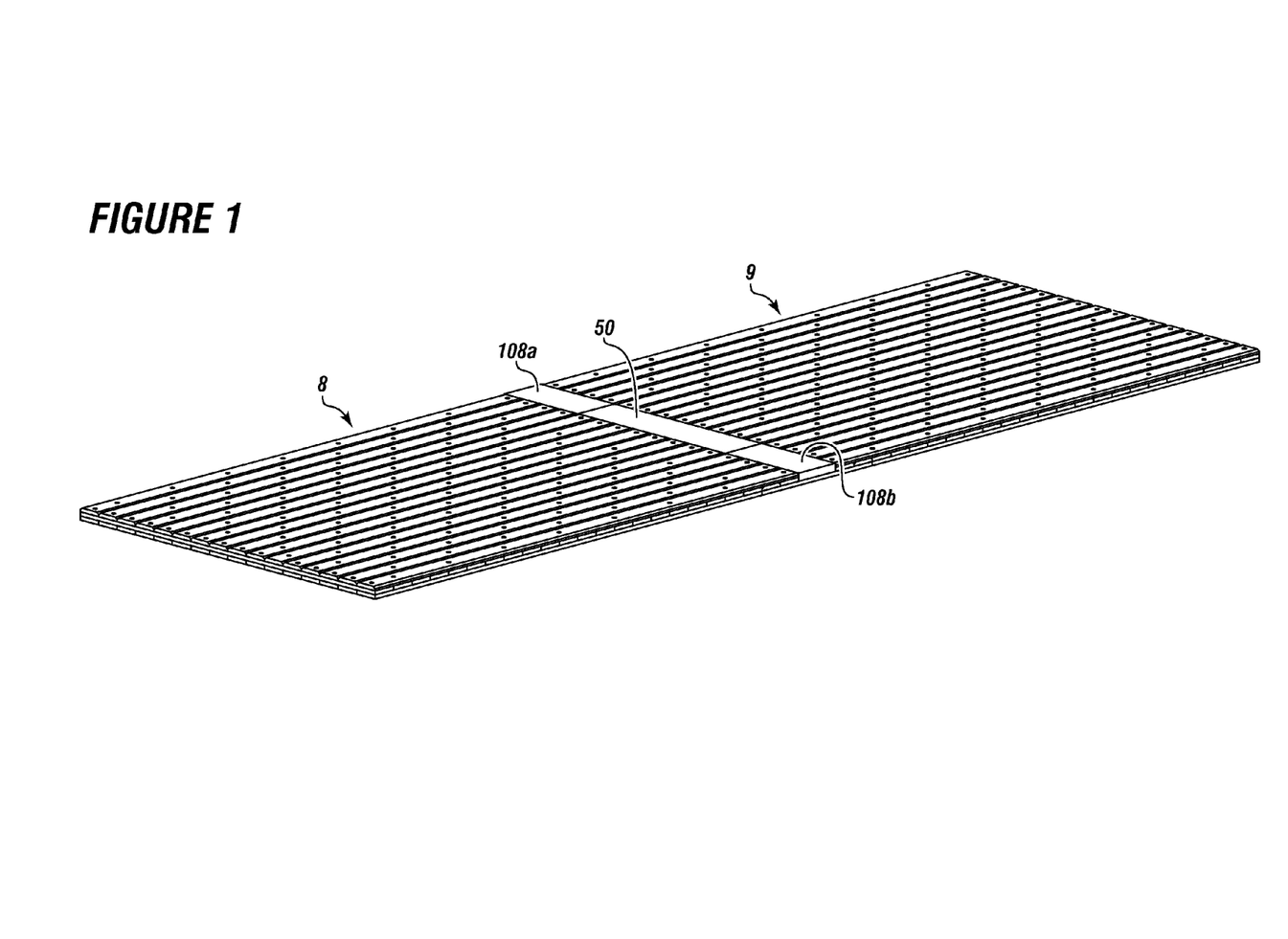
FIG. 1 depicts a top view of an oil field mat assembly with a central coupler and two half couplers according to one or more embodiments.

Turning now to the FIGS., FIG. 1 depicts an oil field mat assembly created from a pair of mats 8 and 9 which are connected by a center coupler 50.

The pair of mats 8 and 9 can also be connected by a first half coupler 108a, in series with a center coupler 50 and a second half coupler 108b. In this figure, the oil field mat assembly is depicted without a third and fourth mat attached.

The center coupler 50 is shown disposed between the first half coupler 108a and aligned with a second half coupler 108b to connect the two pairs of mats forming the oil field mat assembly while simultaneously preventing lateral and longitudinal movement to each connected mats.

Figure 2:
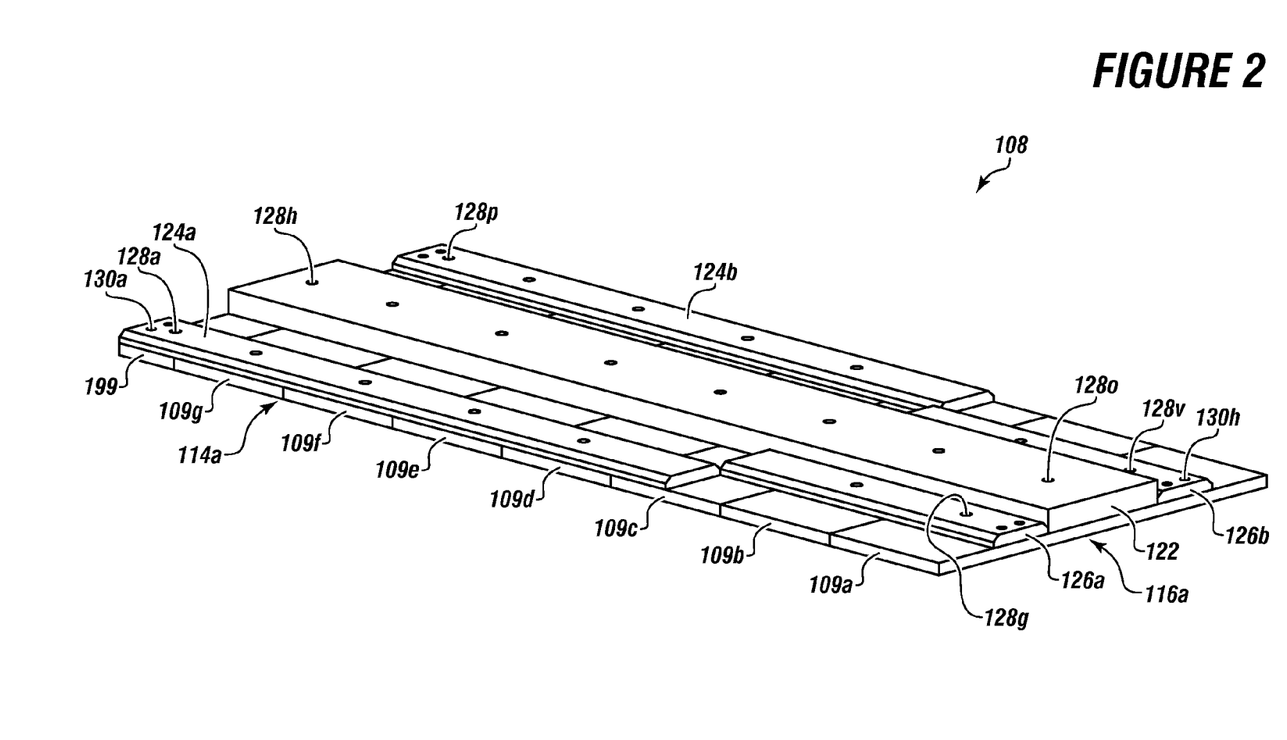
FIG. 2 depicts a top view of a half coupler usable in the oil field mat assembly according to one or more embodiments.

FIG. 2 depicts a top view of a half coupler 108 usable in the oil field mat assembly according to one or more embodiments.

In this Figure, a half coupler base is shown and can be formed from a plurality of parallel boards 109a, 109b, 109c, 109e, 109f, and 109g and one half board 199.

The half coupler base is formed with two half coupler long edges 114a and two half coupler short edges 116a, only the first half coupler long edge and half couple short edges are depicted.

In an embodiment the half coupler base can be formed from about six parallel beveled boards and a half board 199. In one or more embodiment, the boards can have straight edges.

The plurality of parallel boards 109a-109g can have a length from about 36 inches to about 42 inches and a width from about 5 inches to about 9 inches A half coupler central board 122 can be mounted to a portion of the plurality of parallel boards 109a-109g. The half coupler central board 122 can be a single board, which can have twice the thickness of one of the plurality of parallel boards 109a-109g. In one or more embodiments, the half coupler central board 122 can also be a stack of two of the parallel boards.

The half coupler central board 122 can be fixed longitudinally down the center of the half coupler base and at right angles to the orientation of the plurality of parallel boards 109a-109g that form the half coupler base.

The half coupler 108 includes a pair of half coupler longitudinal movement control boards 124a and 124b mounted on top of and at right angles to the orientation of the parallel beveled boards.

The half coupler longitudinal movement control boards 124a and 124b can each align with one of the half coupler long edges 114a.

Each half coupler longitudinal movement control board 124a and 124b can be positioned at least a board width from one of the half coupler short edge 116a while being flush with the other half couple short edge, not shown in this Figure. As referenced in this application "a board width" can be from about 2.5 boards' length or can range from about 17 inches to about 18 inches.

The half coupler lateral movement control boards 126a and 126b can each be mounted in parallel with the half coupler central board 122 and at a right angle to the plurality of parallel boards 109a-109g forming the half coupler base. The half coupler lateral movement control boards 126a and 126b can either be flush with the half coupler central board 122 or spaced apart from the half coupler central board 122.

Each half coupler lateral movement control board can be aligned with the same half coupler short edge 116a of the half coupler base.

A plurality of half coupler fastener 128a, 128h, 128g, 128o, 128p, and 128v, which can be bolts, and can be used to connect the half coupler lateral movement control boards, the half coupler longitudinal movement control boards, and the half coupler central board to the plurality of parallel boards. The plurality of half coupler fasteners can be threaded bolts or lag screws.

A plurality of half coupler connectors 130a and 130h can be used for attaching the half coupler lateral movement control boards and the half coupler longitudinal movement control boards to the plurality of parallel boards to maintain the original shape of the assembled half coupler and facilitate in maintaining the original shape of each mat engaged with the half coupler. The half coupler connectors can be screws.

In one or more embodiments, the couplers and half couplers connect but also separate the mats. The mats can be separated by the half coupler central board. Locking members of the mats can lock into spaces between the half couple central board, the longitudinal movement control boards and the lateral movement control boards of each half coupler.

Figure 3:
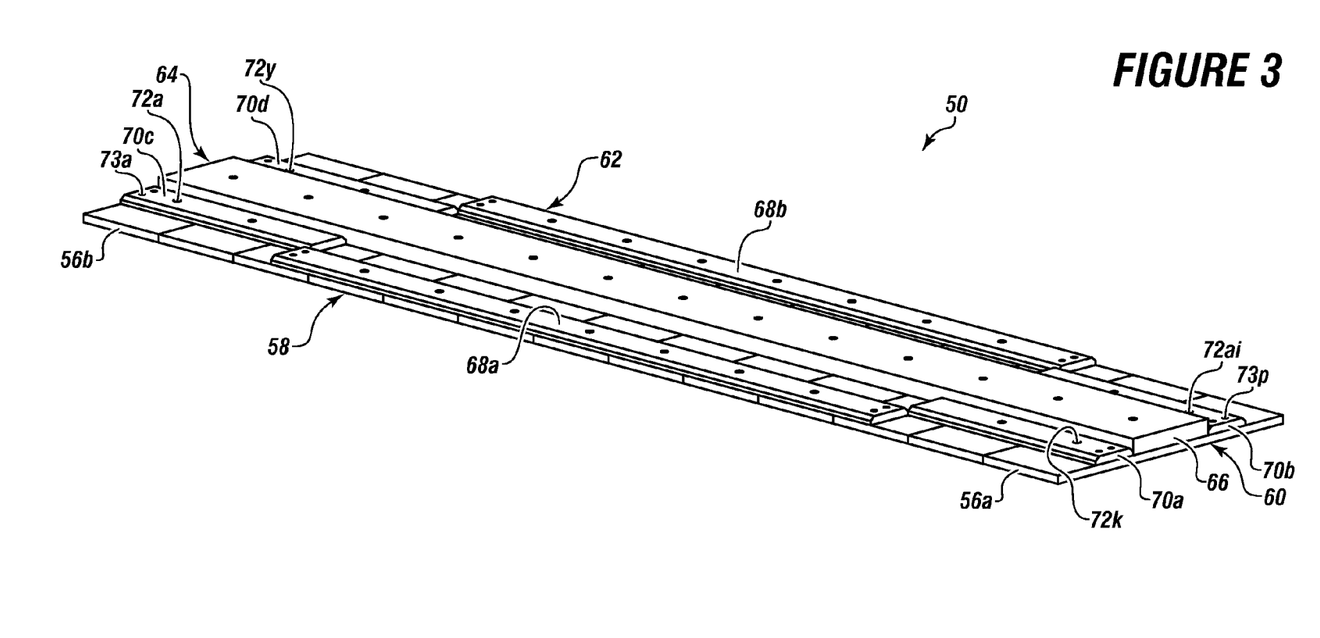
FIG. 3 is a top view of a central coupler according to one or more embodiments.

FIG. 3 is a top view of a central coupler according to one or more embodiments.

The central coupler 50 has a central coupler base that can be formed from coupler boards 56a and 56b. In one or more embodiments, thirteen coupler boards can be used to form the coupler base and can be connected in parallel.

In one or more embodiments, each coupler board of the central coupler base can have a length from about 35 inches to about 40 inches and a width from about 7 inches to about 8 inches.

The central coupler base forms a first long edge 58, a first short edge 60, a second long edge 62 opposite the first long edge 58, and a second short edge 64 opposite the first short edge 60.

A coupler central board 66, which can also be a stack of two of the coupler boards, can be positioned over a central longitudinal axis of the coupler boards and attached to the coupler boards at an orientation which is a right angle to the orientation of the coupler boards.

A pair of longitudinal movement control boards 68a and 68b can be mounted at an orientation which is a right angle to the orientation of the coupler boards.

Each longitudinal movement control board can be mounted to align with one of the long edges 58 or 62. Each longitudinal movement control board can be positioned about 2.5 boards apart from each short edge 60 and or 64, such as from about 17 inches to about 18 inches.

Two pairs of lateral movement control boards, a first pair of lateral movement control boards 70a and 70b and a second pair of lateral movement control boards 70c and 70d are depicted. The lateral movement control board pairs can be mounted in parallel with the coupler central board 66 but spaced apart from the coupler central board 66.

Each lateral movement control boards can be aligned with one of short edges 60 or 64 of the coupler base.

A plurality of central coupler fasteners 72a, 72k, 72y, and 72ai can be used to connect the coupler central board, the lateral movement control boards, and the longitudinal movement control boards to the coupler boards of the central coupler base. The coupler fasteners can be threaded bolts.

A plurality of central coupler connectors 73a and 73p can be used to connect the lateral movement control boards and the longitudinal movement control boards to the coupler boards of the central coupler base to maintain a shape of the central coupler base.

In one or more embodiments, the central coupler can be used to connect together two mats, four half mats or four half portions of four full mats without any additional fasteners.

The top layers of the half mats and the full mats can be separated by the coupler central board 66 and the bottom layers of the half mats and the full mats can be separated by the bottom layer of the couplers.

The mats connect to the central coupler or the half coupler by over-locking portions of the middle layers together in the spaces between the lateral and longitudinal movement control boards of the couplers.

The central coupler when connected to the mats can prevent longitudinal and lateral movement on the connected mats and can also facilitate the mats maintaining their original shape.

Figure 4:
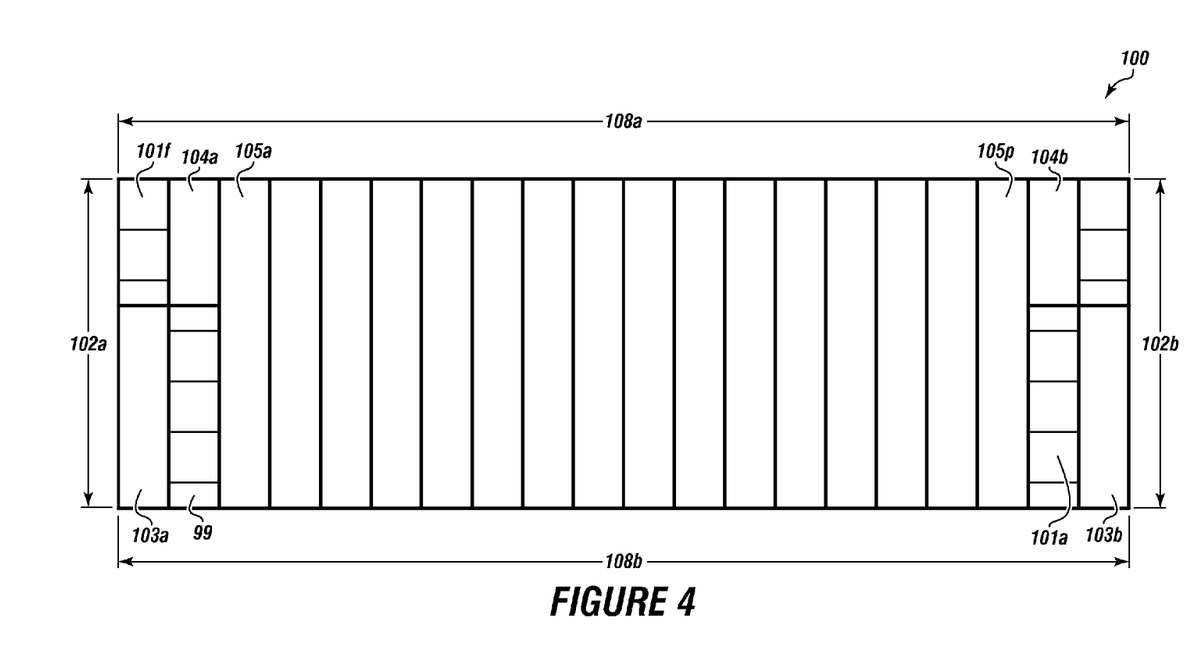
FIG. 4 is a top view of cross ties mounted to a base layer of a half mat usable to connect two full mats together according to one or more embodiments.

FIG. 4 is a top view of a half mat usable to connect two full mats together according to one or more embodiments.

A half mat 100 is shown with half mat base boards 101a and 101f, which can be mounted in parallel. In one or more embodiments, the half mat base can include about 6.5 boards. The boards can include the half mat base boards 101a and 101f and a half mat half bottom board 99.

A pair of half mat longitudinal movement control boards 103a and 103b can be attached to the half mat base boards 101a and 101f at an orientation at a right angle to the orientation of the half mat base boards and aligned with an edge of each short side 102a and 102b of the half mat base.

A pair of half mat lateral movement control boards 104a and 104b can be mounted to be flush with the long sides 108a and 108b of the half mat base. The half mat lateral movement control boards 104a and 104b can extend 2.5 board widths across the half mat base boards of the half mat base at a right angle to the orientation of the half mat base boards of the half mat base.

At least two and up to seventeen cross ties 105a and 105p, which can be oriented at a 90 degree angle to the orientation of the half mat base boards 101a and 101f, and 99, wherein the first of the cross ties is affixed to the half mat base boards at least two cross tie board width in from each short side of the half mat base.

In an embodiment, from about 3 to about 7 cross ties can be eliminated in the row of cross ties, in an alternating manner to the cross ties to provide a more light weight mat assembly, which is easier and cheaper for transport.

Figure 5A:
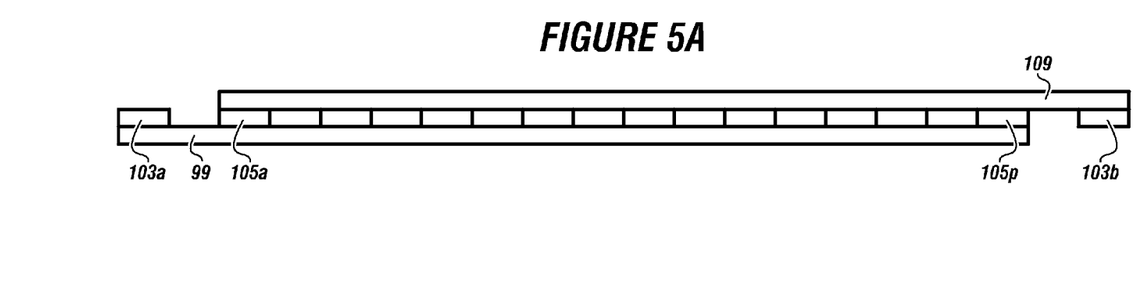
FIG. 5A is a side view of an assembled half mat with top layer according to one or more embodiments.

FIG. 5A is a side view of an assembled half mat with top layer according to one or more embodiments.

In one or more embodiments, the half mat can have a half mat half bottom board 99 over which is mounted on one edge one of the half mat longitudinal movement control board 103a. On an opposite side is another half mat longitudinal movement control board 103b. A board width vacancy is formed between each of the half mat longitudinal movement control boards 103*a* and 103*b* and a plurality of cross ties 105*a* and 105*p* which are mounted at a right angle to the half mat half bottom board 99.

Also shown in this Figure is a one half width top layer parallel board 109.

Figure 5B:
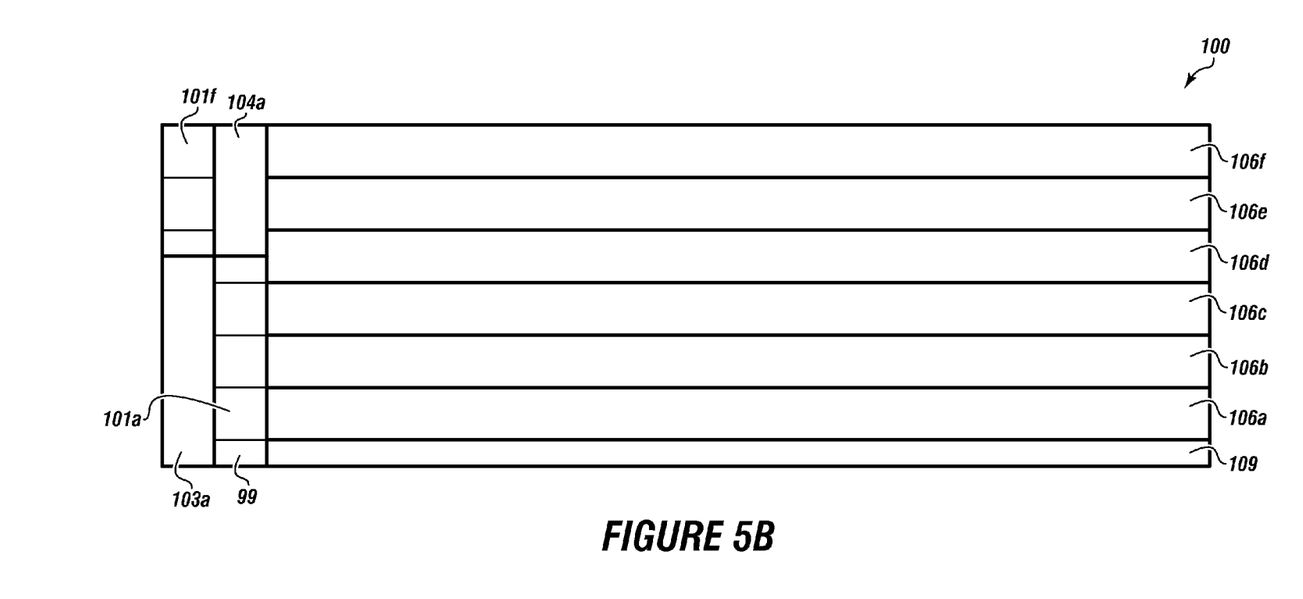
FIG. 5B is a top view of the assembled half mat of FIG. 5A.

FIG. 5B is a top view of the assembled half mat of FIG. 5A.

In one or more embodiments, the top layer for the half mat 100 can be formed from top layer parallel boards 106*a*, 106*b*, 106*c*, 106*d*, 106*e*, and 106*f* and one half width top layer board 109.

The top layer parallel boards 106*a*-106*f* can be attached at a right angle to the plurality of cross tie and parallel with the half mat base boards 101*a* and 101*f* and the half mat half bottom board 99.

Also shown in this Figure is the half mat longitudinal movement control board 103*a* and the half mat lateral movement control board 104*a*.

The base layer stops two board widths, such as about 15 inches to about 17 inches, forming an interlock opening. Longitudinal movement control boards can affix to the top layer, but not the bottom layer or the cross ties. The cross ties can connect to all of the top layer and all of the bottom layer. The longitudinal movement control boards can attach to the base layer.

Figure 6A:
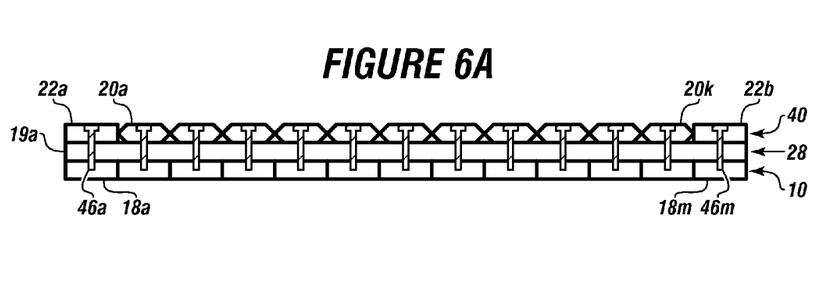
FIG. 6A is a side view of a three layer mat usable with the central coupler, half coupler, or half mat according to one or more embodiments.

FIG. 6A shows a side view of a three layer mat with a bottom layer 10, a middle layer 28, and a top layer 40.

The bottom layer can be formed from bottom layer boards. 18*a* and 18*m*. In an embodiment the bottom layer can be formed from thirteen bottom layer boards connected in parallel with each other and having identical widths, lengths, and heights.

In one or more embodiments, each bottom layer board can have a width ranging from about 5 inches to about 8 inches, a height ranging from about 1 inch to about 2 inches and a length ranging from about 30 inches to about 144 inches.

In one or more embodiments, the bottom layer boards can have straight edges and in other embodiments, the bottom layer boards can be beveled on two sides.

The middle layer 28 can be formed from a plurality of middle layer boards 19*a*.

The middle layer boards can be connected to the bottom layer boards with fasteners 46*a* and 46*m*, which can extend from the top layer through the middle layer and into the bottom layer.

In this embodiment, the top layer is shown with top beveled boards 20*a* and 20*k* that are in the same orientation as the bottom layer boards 18*a* and 18*m*. Square edged boards 22*a* and 22*b* can also be used, such as at the edge of the mat as shown in this embodiment.

In one or more embodiments, the top bevel boards and the bottom layer boards can be in parallel with the edges of each other.

Figure 6B:
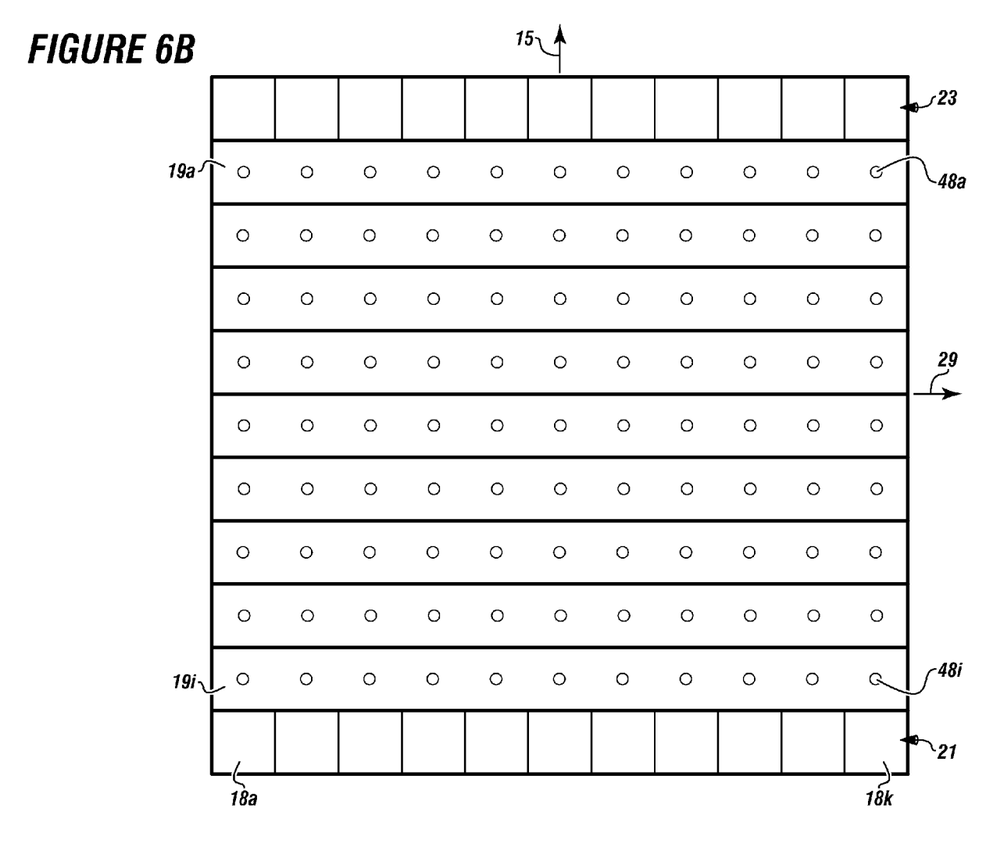
FIG. 6B is a top view of the mat of FIG. 6A with the top layer removed.

FIG. 6B is a top view of a middle layer disposed over a bottom layer of a full mat.

The middle layer boards 19*a* are 19*i* are shown positioned at a right angle to the orientation of the bottom layer boards 18*a* and 18*k*. The middle layer boards can be connected in parallel with each other and having identical widths, lengths, and heights.

Fasteners and/or connectors 48*a* and 48*i* are shown for securing the three layers together through the middle layer boards.

In one or more embodiments, the middle layer boards can be secured to the bottom layer boards with a plurality of connectors. The connectors can be screws used to maintain the shape of the mat, and reduce torque effects on the mat.

A first edge of the bottom layer 21 and a second edge of the bottom layer 23 are shown in this Figure.

A middle layer orientation 29 of the middle layer is shown at a right angle to a bottom layer orientation 15.

Figure 7:
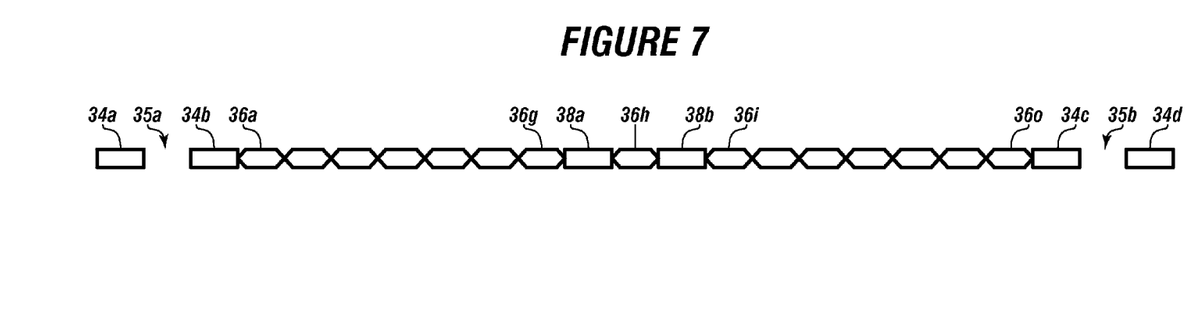
FIG. 7 is a side view of an embodiment of the middle layer.

FIG. 7 shows the middle layer of an embodiment of the oil field mat assembly.

In this embodiment, the middle layer can have middle layer beveled boards 36*a*, 36*g*, 36*i*, and 36*o* and two spacer boards 38*a* and 38*b*, which can be disposed strategically between the middle layer beveled boards. The spacer boards can be square or rectangular.

In this embodiment, the middle layer can have a second square edged board 34*b* adjacent seven middle layer beveled boards, which can be adjacent the first spacer board 38*a*. An eighth middle layer beveled board 36*h* is shown adjacent the first spacer board 38*a*.

A second spacer board 38*b* can be adjacent the eighth middle layer beveled board 36*h* and seven middle layer beveled board, which can be connected in parallel. Middle layer beveled board 36*o* adjoins the third square edged board 34*c*.

A board width size vacancy 35*a* is provided between the first square edged board 34*a* and the second square edged board 34*b*. On the opposite end, a board width size vacancy 35*b* is provided between the third square edged board 34*c* and the fourth square edged board 34*d*.

In an embodiment, the fasteners can be bolts and can be used per board through the top layer, through the middle layer, to the bottom layer to fasten the three layers together.

Figure 8:
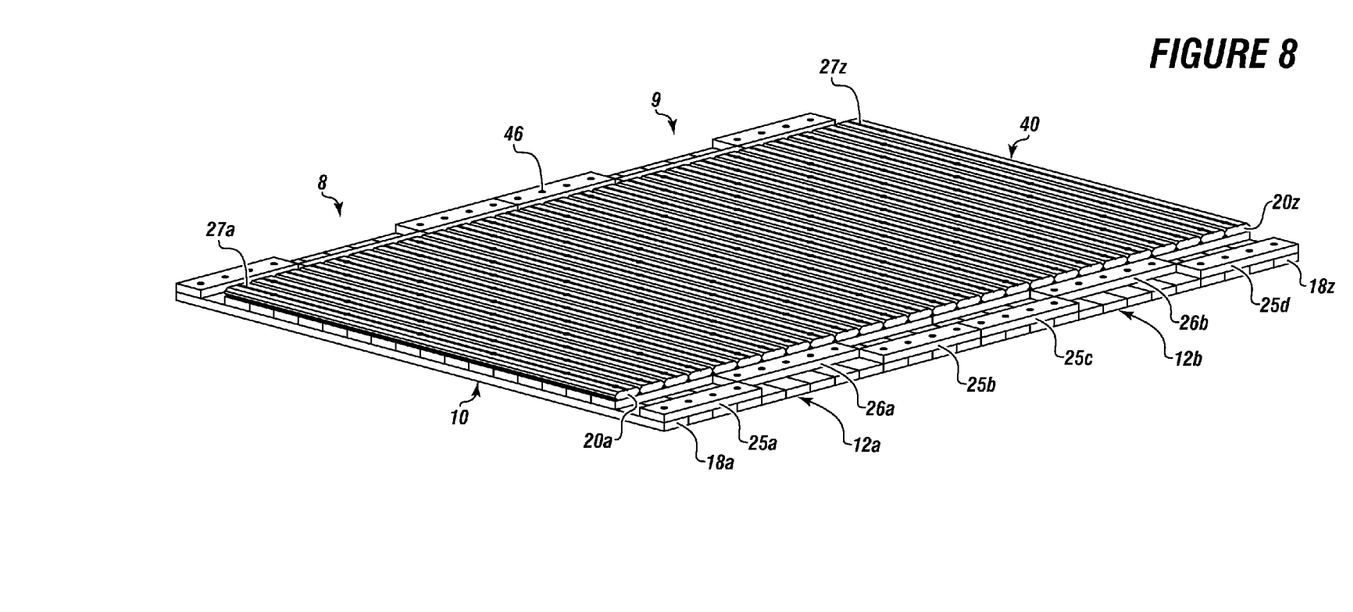
FIG. 8 is a detailed perspective view of an interlock assembly according to one or more embodiments.

FIG. 8 depicts two mats 8 and 9, each with an interlock assembly formed in the bottom layers.

Each mat is formed with bottom layer boards 18*a* and 18*z* forming a bottom layer 10 on a first side 12*a* of mat 8 and a first side 12*b* of mat 9.

Two aligned locking members 25*a* and 25*b* are attached to the bottom layer 10 of mat 8 and aligned with the edge of the first side 12*a* to provide longitudinal movement control.

Two aligned locking members 25*c* and 25*d* are attached to the bottom layer 10 of mat 9 and aligned with the edge of the first side 12*b* to provide longitudinal movement control.

A first offset locking member 26*a* can be disposed between the two aligned locking members 25*a* and 25*b* and positioned apart from the edge of the first side 12*a*.

A second offset locking member 26*b* can be disposed between the two aligned locking members 25*c* and 25*d* and positioned apart from the edge of the first side 12*b*.

Also shown is the top layer 40 with top beveled boards 20*a* and 20*z*. In one or more embodiments, the top beveled boards can each have a groove 27*a* and 27*z*.

Fasteners 46 are also shown for holding the offset locking members and the aligned locking members.

Figure 9:
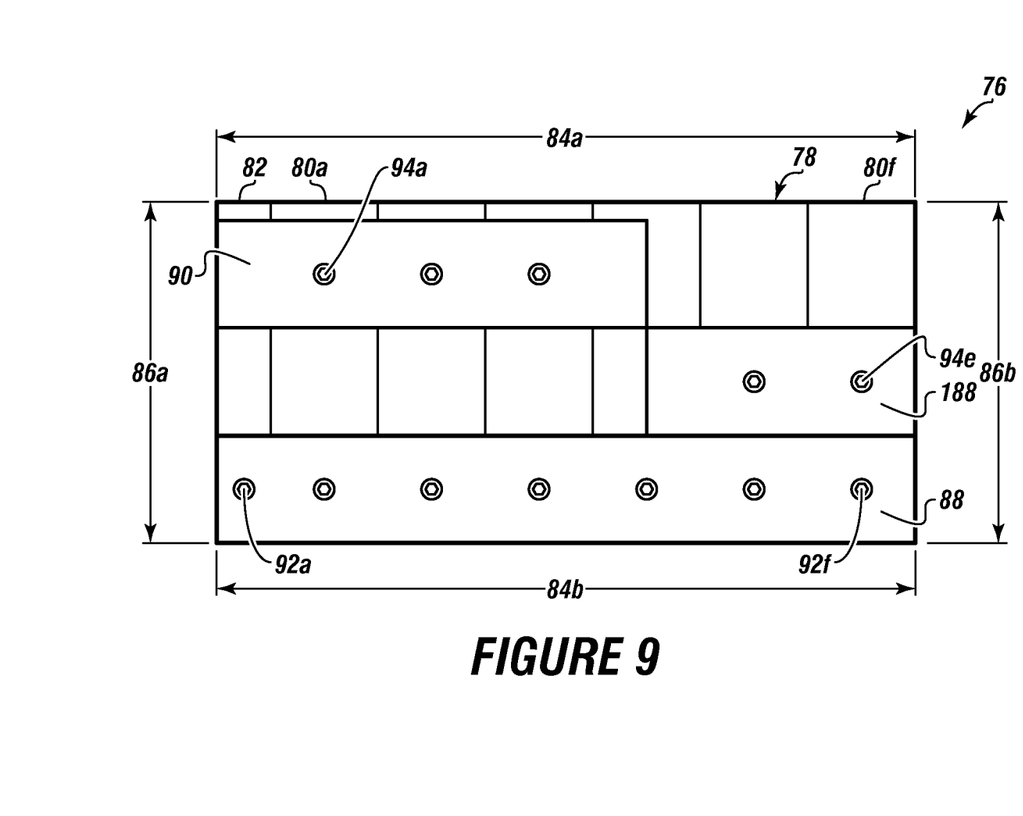
FIG. 9 is a detailed view of a half end cap usable with the interlock assembly of each mat.

FIG. 9 shows one of the half end cap configurations used with two connected mats forming the oil field mat assembly.

In other embodiments, two half end caps and one full end cap can be used on the side of the pair of mats which are not connected using the couplers of the half mats.

In one or more embodiments, the end caps can engage the interlock assemblies of the bottom layer.

FIG. 9 shows half end cap 76 with an end cap top formed from end cap beveled boards 80*a* and 80*f* and a half end cap board 82. In one or more embodiments, from six end cap beveled boards and a half end cap board can be used.

The end cap beveled boards 80*a* and 80*f* can be positioned in parallel with each other. The assembled parallel end cap beveled boards form an end cap top 78 with a pair of end cap long sides 84*a* and 84*b* and a pair of end cap short sides 86*a* and 86*b*.

An end cap longitudinal movement control board 88 can be mounted to the top layer of parallel boards at an orientation at a right angle to the orientation of the top layer parallel boards.

The end cap longitudinal movement control board 88 can be a stack of two of the end cap beveled boards mounted on top of each other and fastened to the top layer of parallel boards.

The end cap longitudinal movement control board 88 serves to prevent and longitudinal movement of each mat of the mat assembly by connecting with the interlock assembly of the bottom layer of the mat.

The end cap longitudinal movement control board 88 can be aligned with one of the end cap long sides 84a and both end cap short sides 86a and 86b of the end cap top 78.

An end cap lateral movement control board 90 can be mounted to the end cap beveled boards that form the end cap top 78 in parallel with but spaced apart from the end cap straight edge locking board 188 and at a right angle to the orientation of the beveled parallel boards that form the end cap top.

The end cap lateral movement control board 90 can be mounted adjacent the end cap long side 84b opposite the end cap straight edge locking board 188 for preventing longitudinal movement of the mat connected to the end cap.

A plurality of end cap fasteners 92a and 92f can connect the end cap lateral movement control board, the end cap longitudinal movement control board, and the straight edge locking board 188 to the end cap beveled boards of the end cap top.

A plurality of end cap connectors 94a can also be used to enable the half end cap to maintain a preset shape and facilitate the maintenance of a preset shape for each mat connected thereto.

The end cap beveled boards 80a and 80f and the half end cap board 82 can be in parallel but offset from the end cap beveled boards connected in parallel forming the top layer of the mat.

The end cap lateral movement control board 90 of the half end cap 76 engages between the two aligned locking members of the interlock edge on the bottom layer of the mat.

The end cap longitudinal movement control board 88 locks between the interlock edge of the bottom layer of the mat and the offset locking member.

Figure 10:
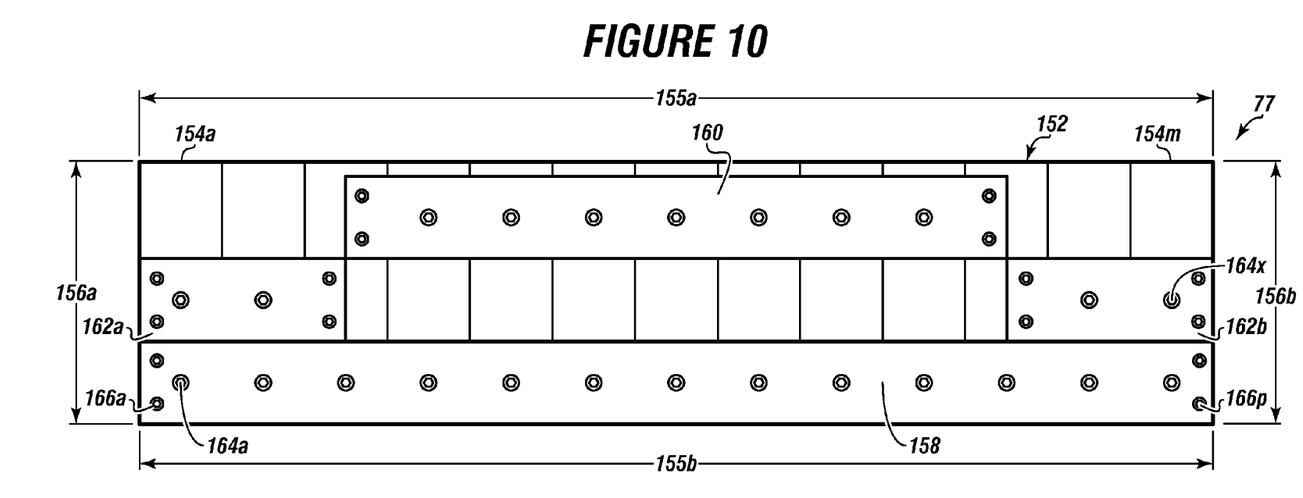
FIG. 10 is a top view of a full end cap usable with the interlock assembly of each mat.

FIG. 10 is a top view of a full end cap is a top view of a full end cap usable with the interlock assembly of each mat.

The full end cap 77 can be made from full end cap beveled boards 154a and 154m mounted in parallel. In one or more embodiments the full end cap can be made from thirteen end cap beveled boards.

The full end cap beveled boards form a full end cap top 152 with a pair of full end cap long sides 155a and 155b, which can be about 96 inches long, and a pair of full end cap short sides 156a and 156b, which can be about 23 inches long.

A full end cap locking board 158, which can be formed from two stacked boards, and can be straight edged or beveled edged, can be mounted to the full end cap top 152 to prevent longitudinal movement of the mats engaged with the top.

The full end cap locking board 158 can be aligned with one of the full end cap long sides 155a and with both full end cap short sides 156a and 156b of the full end cap top 152.

A full end cap longitudinal movement control board 160 can be mounted to the full end cap top 152 in parallel proximate to the full end cap long side 155a. In an embodiment the full end cap longitudinal movement control board 160 can be flush mounted to the full end cap long side 155a.

The full end cap longitudinal movement control board 160 is for preventing longitudinal movement on the pair of mats to which the full end cap is attached.

The full end cap top also includes a pair of full end cap lateral movement control boards 162a and 162b.

Each full end cap lateral movement control boards 162a and 162b can be mounted to the full end cap top 152 in parallel with the full end cap locking board 158 and at right angles to the full end cap beveled boards 154a and 154m.

In an embodiment, each full end cap lateral movement control board 162a, 162b can be mounted flush with one of the full end cap short sides 156a or 156b of the full end cap top 152 proximate to the full end cap locking board 158.

A plurality of full end cap fasteners 164a and 164x can connect the full end cap lateral and longitudinal movement control boards, which include the full end cap locking board 158, to the full end cap beveled boards of the full end cap top. The fasteners can be bolts.

A plurality of end cap connectors 166a and 166p, which can be screws, can connect between full end cap beveled boards and the end cap top to maintain a preset shape of the end cap top and to maintain a preset shape for each mat.

The full end cap lateral movement control boards 162a and 162b of the end cap top 152 can engage between the two aligned locking members of the mats, and the full end cap longitudinal movement control board 160 can lock between the offset locking members of each mat.

Figure 11A:
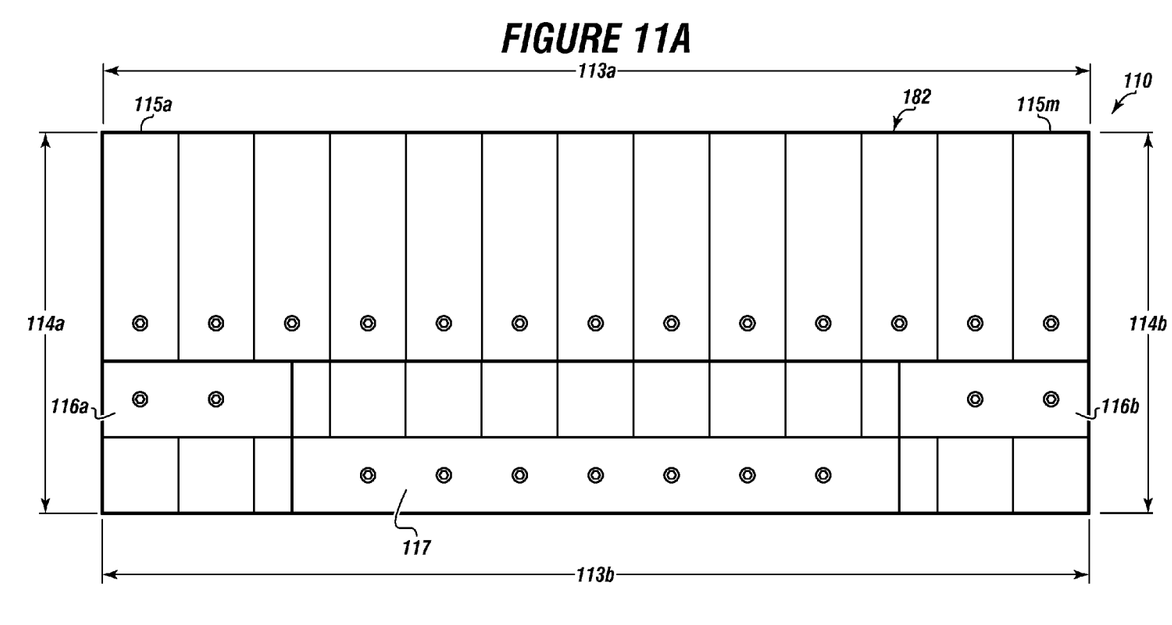
FIGS. 11A-11C are views of a safety end cap according to one or more embodiments.
Figure 11B:
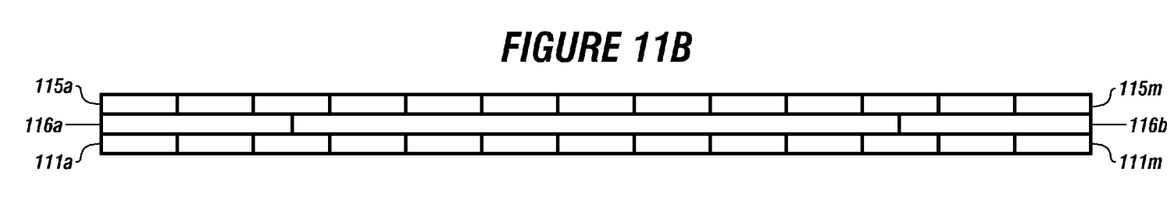
Figure 11C:
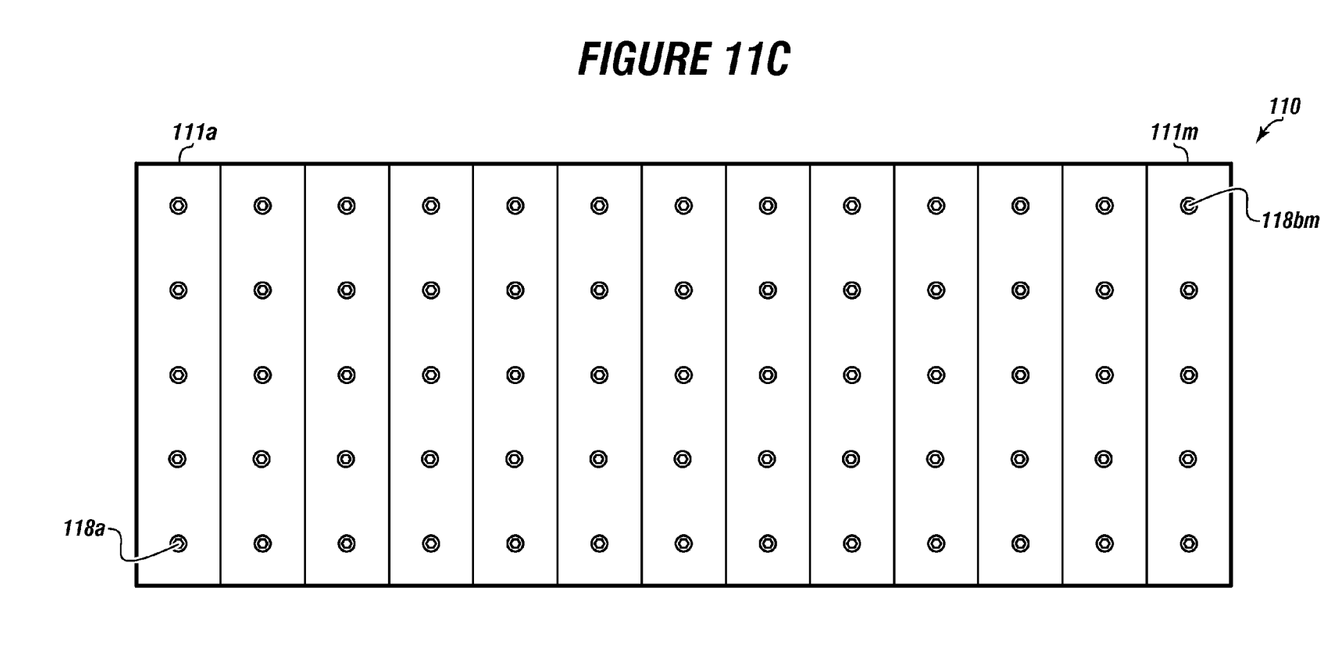

FIGS. 11A, 11B and 11C depict a safety end cap 110 from different view.

Parallel safety beveled boards 111a and 111m can be aligned to form a safety end cap top 182, wherein the aligned parallel safety beveled boards 111a and 111m form a pair of safety long sides 113a and 113b and a pair of safety short sides 114a and 114b. In one or more embodiments, thirteen parallel safety beveled boards can be used.

Middle safety boards, which are not shown in these Figures, can be positioned to the bottom side of the safety end cap 110 and in between and perpendicular to the parallel safety beveled boards 111a and 111m and a plurality of safety top boards 115a and 115m.

In an embodiment, yellow pigment can be added to create seven yellow top boards and six black top boards in an alternating pattern.

A pair of safety lateral movement control boards 116a and 116b wherein one of the safety lateral movement control boards 116a and 116b can be flush with one of the safety shorts sides 114a and 114b and at an orientation at a right angle to the parallel safety beveled boards 111a and 111m.

A safety longitudinal movement control boards 117 can be flush with the safety long side 113b and at a right angle to the parallel safety beveled boards 111a and 111m.

Safety fasteners 118a and 118bm can be used to connect the boards of the safety end cap 110 together.

Figure 12:
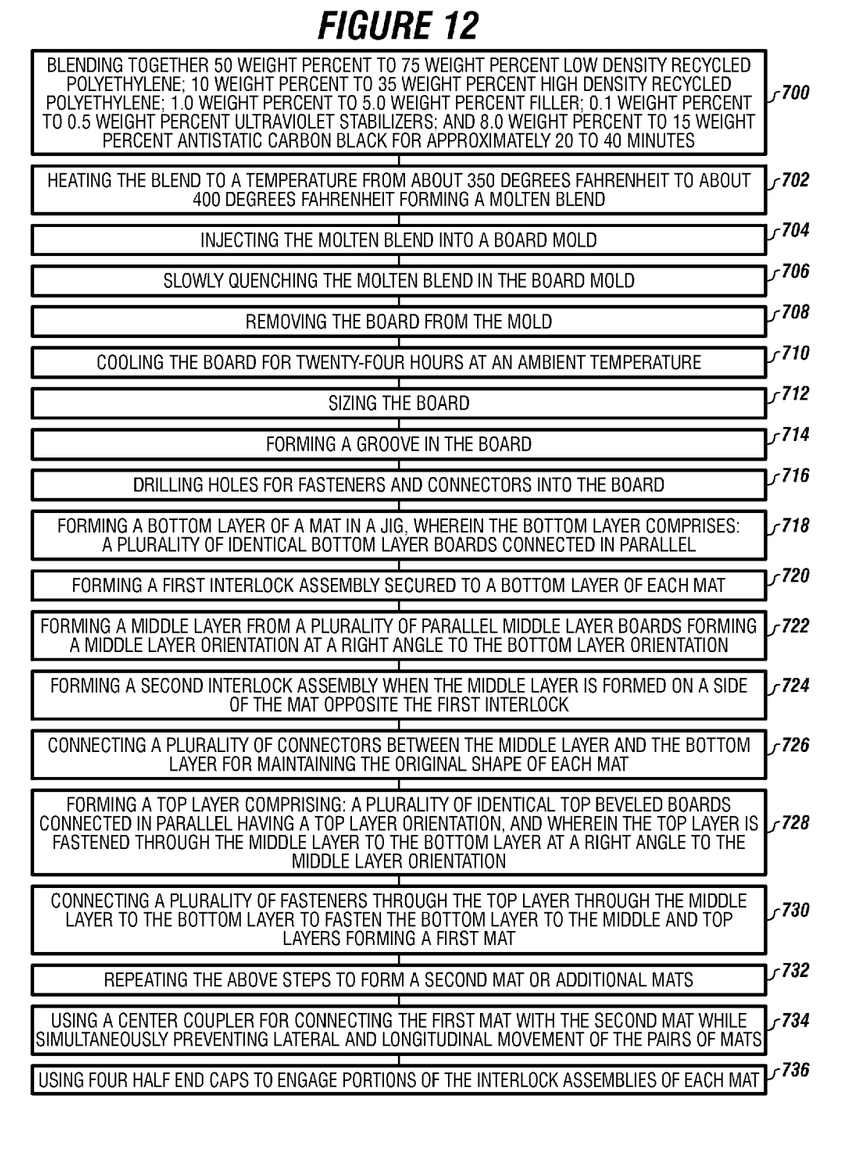
FIG. 12 depicts the method for making an oil field mat from a plurality of synthetic boards.

FIG. 12 depicts the method for making an oil field mat from a plurality of synthetic boards.

The method can involve blending together 50 weight percent to 75 weight percent low density recycled polyethylene; 10 weight percent to 35 weight percent high density recycled polyethylene; 1.0 weight percent to 5.0 weight percent filler; 0.1 weight percent to 0.5 weight percent ultraviolet stabilizers; and 8.0 weight percent to 15 weight percent antistatic carbon black for approximately 20 to 40 minutes, as illustrated by box 700.

The method can include heating the blend to a temperature from about 350 degrees Fahrenheit to about 400 degrees Fahrenheit forming a molten blend, as illustrated by box 702.

The blend can be placed into an extruder at heated at a temperature which is above the melting point of the polyethylene component.

The method can include injecting the molten blend into a board mold, as illustrated by box 704.

The method can include slowly quenching the molten blend in the board mold, as illustrated by box 706.

The slow quenching of the molten blend in the board mold can be done in water to cool.

The method can include removing the board from the board mold, as illustrated by box 708.

The method can involve cooling the board for twenty-four hours at an ambient temperature, as illustrated by box 710. The cooling can be longer or shorter depending on ambient temperature.

The method can include sizing the board, as illustrated by box 712; and can include forming a groove in the board, as illustrated by box 714.

The board can be cut to a desired length depending upon application and the groves can be centrally formed in the top of the boards, such as with a router groove. The groove can be from about 1/16 of an inch to about 1/8 of an inch deep and from about 1/4 of an inch to about 3/8 of an inch in width.

The method can involve drilling holes for fasteners and connectors into the board, as illustrated by box 716.

The method can further involve forming a bottom layer of a mat in a jig, wherein the bottom layer comprises: a plurality of identical bottom layer boards connected in parallel, as illustrated by box 718.

The method can include forming a first interlock assembly secured to a bottom layer of each mat; as illustrated by box 720.

In one or more embodiments, the bottom layer holes can be formed to receive a nut, wherein the nut can be pressed into the bottom layer holes. In another embodiment, a nut can be used for receiving the ends of the fasteners, which can be installed from the top layer.

In one or more embodiment, the bottom layer can be formed using parallel identical boards, and then pins can be placed in the drilled holes to facilitate alignment of the additional layers of boards.

The method can further include forming a middle layer from a plurality of parallel middle layer boards forming a middle layer orientation at a right angle to the bottom layer orientation, as illustrated by box 722.

The method can include forming a second interlock assembly when the middle layer is formed on a side of the mat opposite the first interlock, as illustrated by box 724.

The method can include connecting a plurality of connectors between the middle layer and the bottom layer for maintaining the original shape of each mat, as illustrated by box 726.

In one or more embodiments, the middle boards can be laid at a 90 degree angle to an orientation of the bottom boards and positioned so the pins of the bottom boards can pass through the middle boards. The first and a second interlock assembly are created, one for engagement with the bottom layer, and one for engagement with the top layer.

Connectors can be installed between the middle boards and the bottom boards to ensure retaining of original mat shape, original coupler shape, original half mat shape, or original end cap shape. In an embodiment, the connectors can be screwed in with a power screwdriver or similar power tool.

The method can involve forming a top layer comprising: a plurality of identical top beveled boards connected in parallel having a top layer orientation, and wherein the top layer is fastened through the middle layer to the bottom layer at a right angle to the middle layer orientation, as illustrated by box 728.

The method can involve connecting a plurality of fasteners through the top layer through the middle layer to the bottom layer to fasten the bottom layer to the middle and top layers forming a first mat, as illustrated by box 730.

In one or more embodiments, the top layer can be installed over the pins at an orientation identical to the bottom boards and at a 90 degree angle to the orientation of the middle boards. One pin at a time can then be removed and fasteners, such as bolts can be installed in the holes to connect the three layers together.

The method can further include repeating the above steps to form a second mat or additional mats, as illustrated by box 732.

The method can include using a center coupler for connecting the first mat with the second mat while simultaneously preventing lateral and longitudinal movement of the pairs of mats; as illustrated by box 734.

The method can also include using four half end caps to engage portions of the interlock assemblies of each mat, as illustrated by box 736.

In an embodiment, the half safety caps can be one half the size of a full safety end cap and can use one half the number of boards.

In an embodiment, the mat assembly can include four mats with two 8 foot full end caps, four 4 foot half end caps per two mat assemblies, and one 8 foot center coupler and two 4 foot half couplers.

In an embodiment, the beveled boards can have bevels on each longitudinal side of the beveled boards for a total of four bevels per board.

In an embodiment, each beveled board can have a central groove disposed on the top side of the top beveled boards, which can be for safety and to reduce slipping.

In an embodiment, each end cap can be formed from boards of recycled polyethylene with yellow pigment.

The mat assembly in an embodiment can have from about 3 fasteners to about 20 fasteners installed through each top layer boards, through the middle layer boards, and to the bottom layer boards per mat.

The mat assembly in an embodiment can use from about 13 fasteners to about 247 fasteners installed through top layer boards, through the middle layer boards, and to the bottom layer boards per mat.

In an embodiment, the central coupler and the half coupler can be rectangular in shape.

The mat assembly in an embodiment can use from about 10 fasteners to about 48 fasteners installed through boards on the full or half couplers used to connect the layers of each coupler together.

The mat assembly in an embodiment can use from about 6 fasteners to about 28 fasteners installed through each board to form each full or half end cap.

In an embodiment, the connectors can be screws, bolts, nails, epoxy, or combinations thereof.

In an embodiment, the boards can comprise wood, low density polyethylene, high density polyethylene, copolymers of low density of polyethylene, other plastic material, natural rubber, synthetic rubber, styrene butadiene resin or combinations and blends thereof.

In an embodiment, the boards comprise blends of polyethylene and rubber.

In an embodiment, the layers of each mat can each comprise a different material with different physical properties, including different durometers and different brittleness.

In an embodiment, the top layer is a low density polyethylene, the middle layer is low density polyethylene, and the bottom layer is wood. This assemblage can provide improved rigidity of the mat.

In an embodiment, the boards can be made from 50 weight percent to 75 weight percent low density polyethylene; 10 weight percent to 35 weight percent high density polyethylene; 1.0 weight percent to 5.0 weight percent filler; 0.1 weight percent to 0.5 weight percent ultraviolet stabilizers; and 8.0 weight percent to 15 weight percent antistatic carbon black.

In an embodiment, the formulation can be formed from at least one of the following: 1.0 weight percent to 3.5 weight percent styrene butadiene resin; 0.5 weight percent to 1.0 weight percent sodium bicarbonate; 0.5 weight percent to 3.5 weight percent ethyl vinyl acetate; 1.5 weight percent to 3.5 weight percent polyamide; and 1.0 weight percent to 10 weight percent polyester.

Blends of polyesters and nylons can be used which melt at a different temperature to create a stringiness, or to increase tensile strength.

In an embodiment, from 0.5 weight percent to 2 weight percent pigment can be added to the formulations, such as yellow.

While these embodiments have been described with emphasis on the embodiments, it should be understood that within the scope of the appended claims, the embodiments might be practiced other than as specifically described herein.

What is claimed is:

1. A method for making an oil field mat from a plurality of synthetic boards comprising the steps of:
   a. blending together ranging from 20 minutes to 40 minutes:
      i. 50 weight percent to 75 weight percent low density recycled polyethylene;
      ii. 10 weight percent to 35 weight percent high density recycled polyethylene;
      iii. 1.0 weight percent to 5.0 weight percent filler;
      iv. 0.1 weight percent to 0.5 weight percent ultraviolet stabilizers; and
      v. 8.0 weight percent to 15 weight percent antistatic carbon black;
   b. heating the blend to a temperature ranging from 350 degrees Fahrenheit to 400 degrees Fahrenheit forming a molten blend;
   c. injecting the molten blend into a board mold;
   d. slowly quenching the molten blend in the board mold;
   e. removing the board from the board mold;
   f. cooling the board for twenty-four hours at an ambient temperature;
   g. sizing the board;
   h. forming a groove in the board;
   i. drilling holes for fasteners and connectors into the board;
   j. forming a bottom layer of a first mat in a jig, wherein the bottom layer comprises a bottom layer orientation, and wherein the bottom layer further comprises: a plurality of identical bottom layer boards connected in parallel;
   k. forming a first interlock assembly secured to the bottom layer of the mat, wherein the first interlock assembly comprises:
      i. two first aligned locking members attached to the bottom layer of the mat aligned with a first side of the mat; and
      ii. a first offset locking member disposed between the aligned locking members and positioned apart from the first side of the mat proximate to an edge of the bottom layer;
   l. forming a middle layer from a plurality of parallel middle layer boards forming a middle layer orientation at a right angle to the bottom layer orientation;
   m. forming a second interlock assembly when the middle layer is formed on a side of the mat opposite the first interlock assembly, wherein the second interlock assembly comprises:
      i. two second aligned locking members that attach to the middle layer of the mat on the side of the mat opposite the first two aligned locking members; and
      ii. a second offset locking member disposed between the second aligned locking members and positioned proximate to an edge of the middle layer;
   n. connecting a plurality of connectors between the middle layer and the bottom layer for maintaining the original shape of the mat;
   o. forming a top layer comprising: a plurality of identical top beveled boards connected in parallel having a top layer orientation, and wherein the top layer is fastened through the middle layer to the bottom layer at a right angle to the middle layer orientation;
   p. connecting a plurality of fasteners through the top layer through the middle layer to the bottom layer to fasten the bottom layer to the middle layer and the top layer forming the first mat;
   q. repeating the above steps to form a second mat;
   r. using a center coupler for connecting the first mat with the second mat while simultaneously preventing lateral and longitudinal movement of the pairs of mats; and
   s. using half end caps to engage portions of the interlock assemblies of the mat.

2. The method of claim 1, further comprising using a plurality of half couplers on either side of the center coupler to create a larger oil rig mat, and wherein each half coupler comprises:
   a. a half coupler base layer of parallel beveled boards and one half beveled board connected in parallel forming a pair of half coupler long edges and a pair of half coupler short edge;
   b. a half coupler central board secured over the parallel beveled boards longitudinally down the center of the parallel beveled boards;
   c. a pair of half coupler longitudinal movement control boards mounted to a portion of the parallel beveled boards and aligned with each half coupler long edge and positioned 2.5 boards widths from each half coupler short edge;
   d. a plurality of half coupler lateral movement control boards mounted to a portion of the parallel beveled boards in parallel with the half coupler central board but spaced apart from the half coupler central board, wherein each half coupler lateral movement control board is aligned with one of the half coupler short edges;
   e. a plurality of half coupler fasteners for connecting the half coupler lateral movement control boards, the half coupler longitudinal movement control boards, and the half coupler central board to the parallel beveled boards;
   f. a plurality of half coupler connectors for attaching the half coupler lateral movement control boards and the half coupler longitudinal movement control boards to the parallel beveled boards to maintain the original shape of the half coupler and facilitate in maintaining the original shape of each mat engaged with the half coupler; and
   g. wherein the mats are separated by the half couple central board, and further wherein the locking members of the mats lock into spaces between the half couple central board and the longitudinal movement control boards and lateral movement control boards of each half coupler.

3. The method of claim 1, further comprising using a first half end cap, a full end cap, and a second half end cap for engaging each interlock assembly of the mat opposite the couplers, further wherein each half cap comprises:
   a. a half end cap top comprising six half end cap beveled boards and one half end partial board mounted in parallel, and wherein the half end cap top has a pair of half end cap long sides and a pair of half end cap short sides;
   b. a end cap straight edge locking board mounted to the half end cap top to prevent lateral and longitudinal movement of the mat by interlocking with the interlock assembly of the mat, and wherein the half end cap locking boards are aligned with one of the half end cap long sides and both half end cap short sides;
   c. a half end cap longitudinal movement control board mounted to the half end cap top in parallel with but spaced apart from the mounted half end cap locking board and spaced apart from the half end cap long side for preventing longitudinal movement of the mat to which the half end cap is attached;
   d. a half end cap lateral movement control board mounted to the half end cap top in parallel with the mounted half end cap locking board and flush with the half end cap short sides and spaced apart from the half end cap longitudinal movement control board; and
   e. each full end cap comprises:
      (i) a full end cap top comprising thirteen full end cap beveled boards mounted in parallel, and wherein the full end cap top has a pair of full end cap long sides and a pair of full end cap short sides;
      (ii) a full end cap locking board mounted to the full end cap end cap top to prevent lateral and longitudinal movement of the mats by engaging the interlock assembly of the mat opposite the coupler, and wherein the full end cap locking board is aligned with one of the full end cap long sides and both full end cap short sides of the full end cap top;
      (iii) a full end cap longitudinal movement control board mounted to the full end cap end cap top in parallel with but spaced apart from the full end cap locking board and spaced apart from the full end cap long side of the full end cap end cap top opposite the full end cap locking board for preventing longitudinal movement on the pair of mats to which the full end cap is attached;
      (iv) a pair of full end cap lateral movement control boards, wherein each full end cap lateral movement control board is mounted to the full end cap end cap top in parallel with the full end cap locking board and each full end cap locking board is mounted flush with one of the full end cap short sides of the full end cap end cap top and each full end cap lateral movement control board is spaced apart from the full end cap longitudinal movement control board;
      (v) a plurality of end cap fasteners for connecting end cap boards to the end cap tops; and
      (vi) a plurality of end cap connectors for attaching the end cap boards to the end cap tops to maintaining a preset shape of the end cap tops and to maintain a preset shape for the mat; and
   f. wherein the end cap boards of the end cap tops are offset but in parallel with the boards of the top layer of the mat, and the full end cap lateral movement control boards of the end cap top engage between the two aligned locking members of the interlock assembly of the mat, and the end cap longitudinal boards lock between the interlock assembly and the offset locking member of the mat.

4. The method of claim 3, further comprising using a formulation comprising recycled polyethylene and yellow pigment for each end cap.

5. The method of claim 3, further comprising using from 3 fasteners to 20 fasteners through at least one board of the top layer, at least one board of the middle layer, and at least one board of the bottom layer per mat.

6. The method of claim 3 further comprising using from 13 fasteners to 247 fasteners through at least one board of the top layer, at least one board of the middle layer, and at least one board of the bottom layer per mat.

7. The method of claim 2, further comprising using a rectangular shaped center coupler, rectangular shaped half couplers, or combinations thereof.

* * * * *